United States Patent [19]

Barbee

[11] 4,012,960
[45] Mar. 22, 1977

[54] PRESSURE GAUGE WITH EXPANSIBLE BELLOWS

[75] Inventor: Gail G. Barbee, Montgomery, Ill.

[73] Assignee: Caterpillar Tractor Co., Peoria, Ill.

[22] Filed: Aug. 25, 1975

[21] Appl. No.: 607,523

[52] U.S. Cl. .............................................. 73/410
[51] Int. Cl.² ........................................ G01L 7/06
[58] Field of Search ............... 73/410, 299, 146.8, 73/420, 431; 116/114 PV

[56] References Cited

UNITED STATES PATENTS

| | | | |
|---|---|---|---|
| 1,174,232 | 3/1916 | Copeland | 73/410 |
| 1,274,932 | 8/1918 | Paryzek | 73/410 |
| 1,391,077 | 9/1921 | Richter | 73/410 |
| 1,406,200 | 2/1922 | MacMichael | 73/410 |
| 1,411,917 | 4/1922 | Harris | 73/146.8 |
| 1,696,810 | 12/1928 | Mono | 73/410 |
| 2,190,530 | 2/1940 | Clarkson | 73/146.8 |
| 3,523,451 | 8/1970 | Kohn | 73/146.8 |
| 3,677,218 | 7/1972 | Dixon et al. | 116/114 PV |

Primary Examiner—Donald O. Woodiel
Attorney, Agent, or Firm—Phillips, Moore, Weissenberger, Lempio & Majestic

[57] ABSTRACT

A pressure gauge adapted to sense the level of fuel in a tank comprises a case having a pressure inlet conduit secured thereto and an expansible and contractible bellows attached to the conduit and communicating internally therewith. The indicating means is movably mounted in the case and connected to the bellows for visually indicating the level of fuel in a tank in response to expansion and contraction of the bellows. In a first embodiment of this invention, the indicating means constitutes a color wheel rotatably mounted in the case and connected to the bellows by a rack and pinion gear arrangement. In a second embodiment thereof, the indicating means constitutes a color card secured to the bellows for reciprocal movements therewith. In a third embodiment of this invention, the indicating means constitutes a dial pivotally mounted on the case and connected to the bellows by a lost motion pin and slot connection.

11 Claims, 8 Drawing Figures

PRESSURE GAUGE WITH EXPANSIBLE BELLOWS

BACKGROUND OF THE INVENTION

This invention relates to a pressure gauge particularly adapted for use in connection with fuel tanks for visually indicating the level of fuel retained therein. U.S. Pat. No. 3,726,140, assigned to the assignee of this application, discloses a system for indicating the level of fuel retained in a tank in response to a variable pressure signal. The pressure signal is communicated to a pressure gauge whereby the operator of a vehicle may visually observe when the fuel in the tank drops below a predetermined level. Many conventional pressure gauges of this type are sensitive to shocks and vibrations occurring during the operation of a construction vehicle over uneven terrain, for example. In addition, such gauges are oftentimes complex and may not display accurate readings when subjected to rough usage over extended periods of time.

SUMMARY OF THIS INVENTION

An object of this invention is to provide a non-complex and rugged pressure gauge which is adapted to accurately display visual readouts when subjected to rough usage in that it is substantially insensitive to shocks and vibrations. The pressure gauge comprises a case having pressure inlet means secured thereon for communicating a variable pressure level thereto. An expansible and contractible bellow means communicates internally with the pressure inlet means for expanding or contracting in response to such variable pressure level. An indicating means is movably mounted in the case and drive means connect the indicating means with the bellow means for moving the indicating means in response to expansion and contraction of the bellow means.

BRIEF DESCRIPTION OF THE DRAWINGS

Other objects of this invention will become apparent from the following description and accompanying drawings wherein.

DETAILED DESCRIPTION

Figure 1:
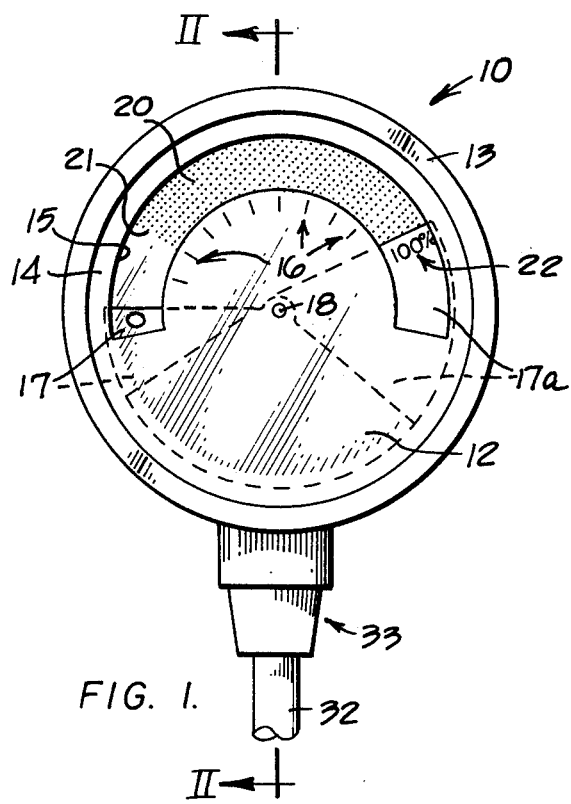
FIG. 1 is a front elevational view of a first pressure gauge embodiment of this invention.
Figure 2:
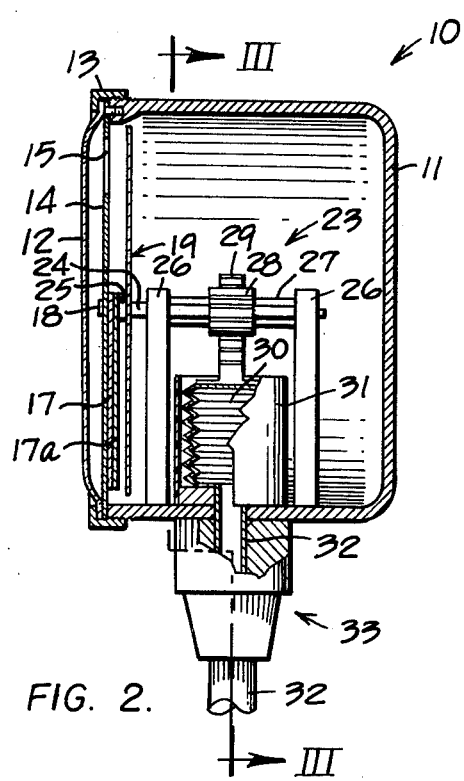
FIG. 2 is a sectional view of the pressure gauge, taken in the direction of arrows II—II of FIG. 1.
Figure 3:
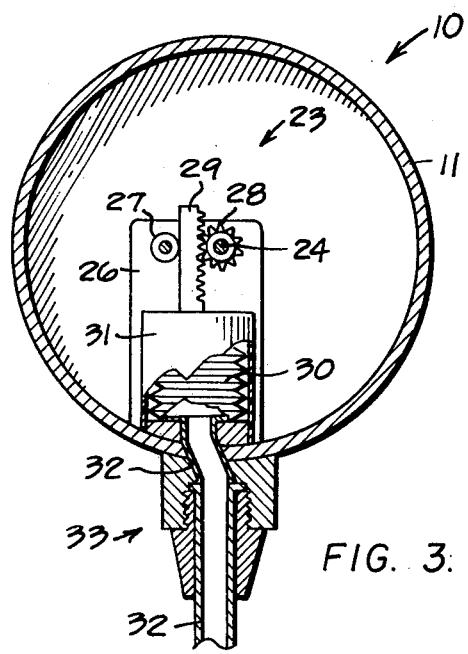
FIG. 3 is a further sectional view of the pressure gauge, taken in the direction of arrows III—III in FIG. 2.
Figure 4:
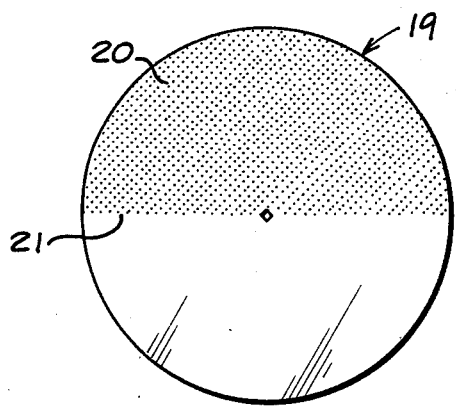
FIG. 4 is a front elevational view of a color wheel rotatably mounted in the pressure gauge.

Referring to FIGS. 1-3, a pressure gauge 10 comprises a cup-shaped case 11 having a lens 12 retained on the front thereof by a nut 13 threadably mounted on the case. The nut further retains a circular plate 14 on the case and in exposed relationship through the lens. The plate has an arcuate slot 15 formed therethrough and graduated fuel level indicia 16 formed thereon for purposes hereinafter explained.

A pair of sectors 17 and 17a are pivotally mounted behind plate 14 by a thumb screw 18. A color wheel 19 is rotatably mounted behind plate 14 and sector 17 to expose color indicia 20 through slot 15 for fuel indicating purposes. In particular, sector 17 can be selectively adjusted on plate 14 to indicate a full tank of fuel when an edge 21 of color indicia 20 substantially coincides with indicia "100%" at 22, printed on sector 17 and the 0-reading on sector 17a can be adjusted to depict an empty tank.

In the illustrated position of the color wheel in FIG. 1, edge 21 is aligned with an indicia 16 indicating that the tank is filled to 20% capacity. Sectors 17 and 17a are movably mounted in the case to selectively mask portions of slot 15 to thus provide adjustment means for adjusting the gauge to adapt it for use with fuel tanks having different capacities and for a wide range of spring rate tolerance in the hereinafter described bellows means. The means for selectively rotating the color wheel relative to plate 14 will now be described.

Such means comprises a drive means 23 including a shaft 24 having color wheel 19 secured on an end thereof by a cap screw 25. The shaft is rotatably mounted between a pair of spaced brackets 26 suitably secured to case 11. A guide means, preferably comprising a roller 27, is also rotatably mounted between the brackets.

The drive means further comprises a pinion 28 secured on shaft 24 and a rack 29 secured on an expansible and contractible bellow means 30. It can thus be seen that expansion and contraction of the convoluted bellows means will reciprocate rack 29, guided by roller 27 which is engaged therewith, to in turn rotate gear 28, shaft 24 and color wheel 19. A cylindrical plastic sleeve 31 is preferably secured to case 11 to closely surround the bellow means in protective relationship therewith and further functions as a guide to provide lateral stability thereto.

The bellows means may be constructed of any thin walled material, such as stainless steel, brass or plastic, which can be suitably convoluted and otherwise constructed to perform the gauge actuating functions hereindescribed.

Pressure inlet means, comprising a conduit 32, is secured in place on a bottom wall of case 11 by a fitting 33. The conduit is further secured to a lower, open end of the bellows means to communicate a variable pressure level therein. As suggested above, such conduit may have its other end integrated into the pressure sensing system disclosed in U.S. Pat. No. 3,726,140 for indicating the level of fuel retained in a tank.

Figure 5:
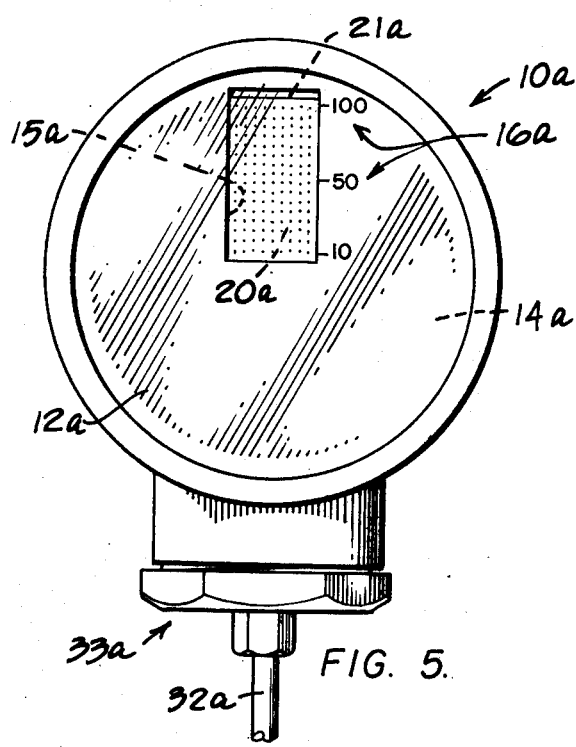
FIG. 5 is a front elevational view of a second pressure gauge embodiment of this invention.
Figure 6:
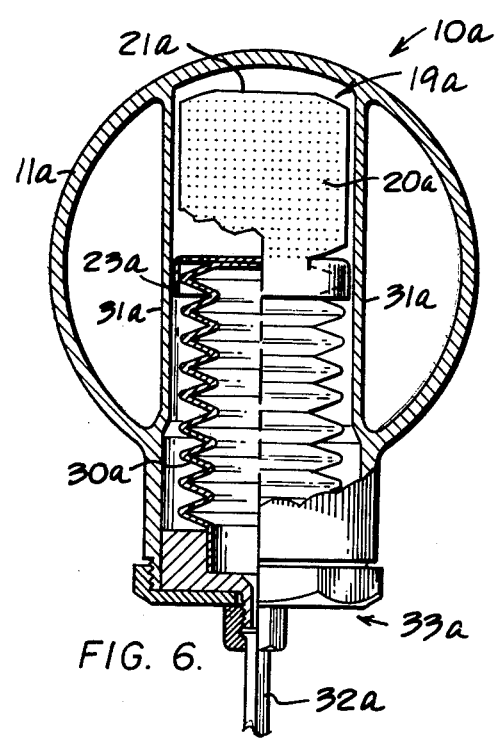
FIG. 6 is a view similar to FIG. 5, but with the front portions of the pressure gauge removed to expose internal components thereof.
Figure 7:
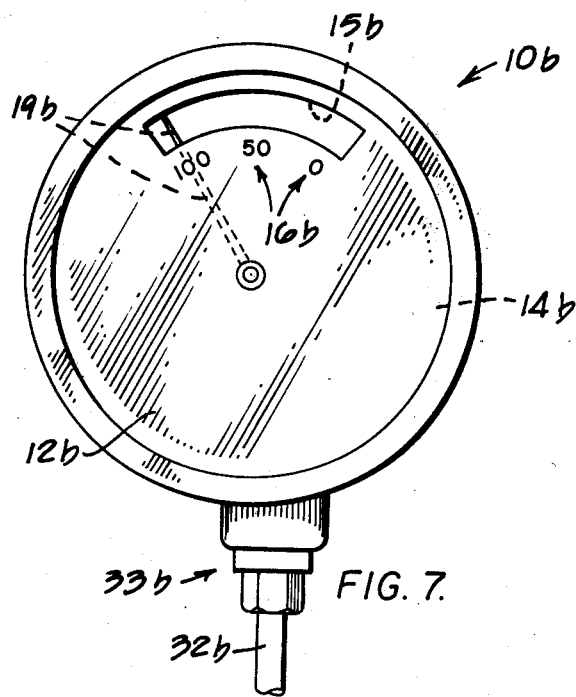
FIG. 7 is a front elevational view of a third pressure gauge embodiment of this invention.
Figure 8:
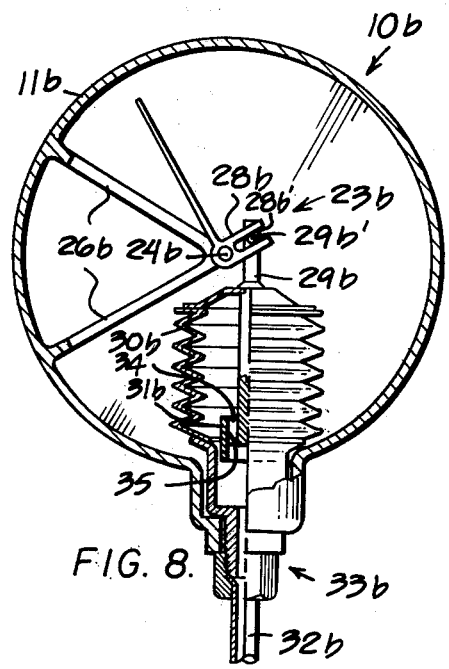
FIG. 8 is a view similar to FIG. 7, but with portions of the pressure gauge removed to expose internal components thereof.

FIGS. 5 and 6 illustrate a second pressure gauge embodiment whereas FIGS. 7 and 8 illustrate a third pressure gauge embodiment of this invention. Identical numerals have been employed to depict corresponding constructions of such embodiments with the numerals depicting constructions of the second embodiment being accompanyed by an *a* and the numerals depicting constructions of the third embodiment being accompanyed by a *b*.

FIGS. 5 and 6 illustrate a second pressure gauge embodiment 10a comprising a case 11a having a glass lens 12a secured on the frontal face thereof. Fuel indicating means comprises a disc or plate 14a secured to case 11a, behind the lens. The disc has a rectangular slot 15a formed therethrough a fuel level indicia means 16a imprinted thereon to indicate the percentage of fuel left in the tank.

The indicating means further comprises a color card 19a having color indicia 20a imprinted thereon. A top edge 21a of the card will indicate the level of fuel retained in the tank by its juxtaposition relative to indicia means 16a. For example, when edge 21a is at its fully extended illustrated position in FIGS. 5 and 6, the tank is indicated as being at its full capacity, i.e., 100%.

Drive means connecting a bellows means 30a to color card 19a for moving the indicating means in response to expansion and contraction of the bellows means may constitute a cup 23a soldered, cemented or otherwise suitably secured to an upper end of the bellows means. Alternatively, a suitably colored and elongated cup could be used in lieu of color card 19a and cup 23a. The card and bellows means are reciprocally mounted within a pair of parallel guides 31a formed integrally with case 11a. The lower end of the bellows means is secured to a fitting 33a further securing an inlet means or conduit 32a to the case for communicating a variable pressure level within the bellows means.

Pressure gauge embodiment 10b of FIGS. 7 and 8 comprises a case 11b having a glass lens 12b secured on the frontal face thereof and a disc 14b secured on the case behind the lens. The disc has fuel level indicia means 16b imprinted thereon to provide indicating means along with a pointer 19b. The pointer is secured to a pivot shaft 24b pivotally mounted on a bracket 26b secured to case 11b.

A drive means 23b, operatively connecting a bellows 30b to pointer 19b, comprises a slotted crank 28b secured to pointer 19b for simultaneous pivotal movement therewith. The crank has a lost motion slot 28b' formed therein which engages a pin 29b' secured on a post 29b. The lower end of the post is suitably secured to the upper closed end of the bellows means and has its lower end slidably mounted in a cylindrical plastic guide 31b. A plurality of spokes 34 (one shown) are formed circumferentially about post 29b to define a plurality of slots 35 for communicating a variable pressure level from an inlet means or conduit 32b interiorly of the bellows means. The conduit is suitably secured in place on case 11b by a fitting 33b.

I claim:

1. A gauge comprising
a case,
pressure inlet means secured on said case for communicating a variable pressure level thereto,
expansible and contractible bellows means communicating internally with said pressure inlet means for expanding or contracting in response to said variable pressure level,
indicating means movably mounted on said case comprising a color wheel rotatably mounted on said case and having color indicia thereon,
means connecting said bellows means to said indicating means for moving said indicating means in response to expansion and contraction of said bellows means upon variance of said pressure level, including a pinion rotatably mounted on said case and having said color wheel connected thereto for rotation therewith and a reciprocal rack meshing with said pinion and secured to said bellows means, and
guide means for guiding reciprocal movements of said rack, including a roller rotatably mounted on said case and engaging said rack.

2. A gauge comprising
a case,
pressure inlet means secured on said case for communicating a variable pressure level thereto,
expansible and contractible bellows means communicating internally with said pressure inlet means for expanding or contracting in response to said variable pressure level,
indicating means movably mounted on said case,
means connecting said bellows means to said indicating means for moving said indicating means in response to expansion and contraction of said bellows means upon variance of said pressure level,
a plate secured to said case and having indicia means exposed thereon and further having a slot formed therethrough to expose said indicating means, said indicia means formed on said plate closely adjacent to said slot and aligned with said indicating means for indicating said variable pressure level and
adjustment means movably mounted in said case to selectively mask portions of said slot.

3. The gauge of claim 2 wherein said slot is arcuate and said indicating means is mounted for pivotal movements in said case.

4. The gauge of claim 2 wherein said adjustment means comprises a sector pivotally mounted on said plate.

5. The gauge of claim 1 wherein said colored indicia member comprises a color wheel rotatably mounted on said case and having color indicia thereon.

6. The gauge of claim 5 wherein said means connecting said bellows means to said indicating means comprises drive means including a shaft rotatably mounted on said case and having said color wheel secured on an end thereof.

7. The gauge of claim 6 wherein said drive means further comprises a pinion secured to said shaft and a rack meshing with said pinion for rotating said pinion and shaft upon reciprocation thereof, said rack secured to said bellows means.

8. The gauge of claim 7 further comprising guide means engaging said rack for guiding reciprocal movements thereof.

9. The gauge of claim 8 wherein said guide means constitutes a roller rotatably mounted on a pair of spaced brackets secured to said case.

10. The gauge of claim 9 wherein said shaft is rotatably mounted on said brackets.

11. The gauge of claim 2 further comprising a cylindrical sleeve secured to said case and closely surrounding said bellows means in protective and guiding relationship therewith.

* * * * *